United States Patent
Wong et al.

(10) Patent No.: US 6,879,429 B2
(45) Date of Patent: Apr. 12, 2005

(54) DRIVE CIRCUIT FOR A MEMS DEVICE

(75) Inventors: John Douglas Evan Wong, Ottawa (CA); Robert Adamson, Toronto (CA); Doug Burbidge, Ottawa (CA); Valeri Klepikov, Ottawa (CA)

(73) Assignee: JDS Uniphase Inc., Ottawa (CA)

(*) Notice: Subject to any disclaimer, the term of this patent is extended or adjusted under 35 U.S.C. 154(b) by 0 days.

(21) Appl. No.: 10/437,465

(22) Filed: May 14, 2003

(65) Prior Publication Data

US 2004/0027638 A1 Feb. 12, 2004

Related U.S. Application Data

(60) Provisional application No. 60/380,279, filed on May 15, 2002.

(51) Int. Cl.[7] .............................................. G02B 26/00
(52) U.S. Cl. ...................................... 359/290; 359/291
(58) Field of Search ................................ 359/290, 291, 359/292, 214, 223, 224, 276, 278, 332; 250/216; 398/42, 43, 75, 79; 361/152, 186, 189, 435

(56) References Cited

U.S. PATENT DOCUMENTS

| | | | |
|---|---|---|---|
| 5,714,773 A | 2/1998 | Burrows et al. | ............... 257/82 |
| 5,859,719 A | 1/1999 | Dentai et al. | ................ 359/171 |
| 5,943,223 A | * 8/1999 | Pond | ............................ 363/53 |
| 6,075,239 A | 6/2000 | Aksyuk | ........................ 250/229 |
| 6,303,885 B1 | 10/2001 | Hichwa et al. | ............. 200/181 |
| 6,310,339 B1 | 10/2001 | Hsu et al. | ................. 250/214.1 |
| 6,351,201 B1 | 2/2002 | Foster | ......................... 335/220 |
| 6,388,359 B1 | 5/2002 | Duelli et al. | ................. 310/309 |
| 6,494,095 B1 | * 12/2002 | Wan | ......................... 73/514.26 |
| 6,515,489 B2 | * 2/2003 | Min et al. | .................... 324/662 |
| 6,525,848 B2 | * 2/2003 | Cao | ............................ 359/107 |
| 6,702,934 B1 | * 3/2004 | DeLeon et al. | ......... 204/298.41 |
| 6,782,153 B2 | * 8/2004 | Polinsky et al. | .............. 385/16 |
| 2003/0196491 A1 | * 10/2003 | Platt | ......................... 73/504.12 |

* cited by examiner

Primary Examiner—Hung Xuan Dang
Assistant Examiner—Tuyen Tra
(74) Attorney, Agent, or Firm—Teitelbaum & MacLean; Neil Teitelbaum; Doug MacLean

(57) ABSTRACT

Small mechanical devices fabricated from semiconductor substrates called micro-electromechanical systems (MEMS) are used in the telecommunications industry for various purposes, such as switching and attenuation. Typically a small mirror or arm is moved into or out of the optical path of a beam of light to redirect of attenuate the signal. The present invention relates to a drive circuit for a MEMS device that converts a low voltage source into a higher more useful voltage pulse. The present invention also relates to an optically powered MEMS device utilizing the aforementioned drive circuit. Moreover, the drive circuit according to the present invention can be used to generate a single exponentially decaying pulse that can both generate an actuation force and a braking force for the MEMS device.

20 Claims, 3 Drawing Sheets

DRIVE CIRCUIT FOR A MEMS DEVICE

CROSS-REFERENCE TO RELATED APPLICATIONS

The present application claims priority from U.S. patent application Ser. No. 60/380,279 filed May 15, 2002.

TECHNICAL FIELD

The present invention relates to a drive circuit for a micro-electro-mechanical systems (MEMS) device, and in particular to a low voltage drive circuit that can be powered by light traveling in an optical network.

BACKGROUND OF THE INVENTION

Switches and other devices utilizing MEMS technology have recently become popular in the fiber optic communication industry due to their versatility, reproducibility, and durability. Conventional MEMS switches include a tiny reciprocating or pivoting mirror that requires a separate electrical power source to generate the voltage, e.g. 30V to 60V, required to move the mirror from a rest position to an active position. One such switch is disclosed in U.S. Pat. No. 6,303,885 issued Oct. 16, 2001 to Bryant Hichwa et al, which is incorporated herein by reference. The switch disclosed in the aforementioned reference is a bi-stable or latching MEMS switch that includes a mirror mounted on a reciprocating beam, which is supported by spring arms. Latching MEMS actuators generally only require a short duration, high voltage pulse to generate an electrostatic actuating force. However, due to the elastic nature of the arms supporting the beam with the mirror, the device tends to oscillate or "ring" before coming to a complete stop. To eliminate this ringing, breaking systems have been developed such as the one disclosed in U.S. patent application Ser. No. 09/810,825 filed Mar. 16, 2001 naming Mao et al as inventors, which is incorporated herein by reference. Unfortunately, these devices still require a steady high voltage source. Other devices using MEMS in the fiber optic communications industry include attenuators and dynamic gain equalizers.

The concept of using optical energy to actuate a switch is disclosed in U.S. Pat. No. 6,310,339 issued Oct. 30, 2001 in the name of Hsu et al; U.S. Pat. No. 5,714,773 issued Feb. 3, 1998 to Burrows et al; U.S. Pat. No. 5,859,719 issued Jan. 12, 1999 to Dentai et al; and U.S. Pat. No. 6,075,239 issued Jun. 13, 2000 to Aksyuk et al. Unfortunately, the Hsu et al device still requires a separate power source to provide a base voltage, to which the optical power is added to raise the total voltage over a threshold voltage, which actuates the switch. The remaining three references disclose devices that only generate very low voltages, and in reality would not be able to generate the energy required to power a conventional MEMS device, only simple specially designed devices.

An object of the present invention is to overcome the shortcomings of the prior art by providing a drive circuit for a conventional MEMS device that utilizes a low voltage source to generate a high voltage pulse.

Another object of the present invention is to provide an actuator for a MEMS switch that both drives and brakes the system with very little if any ringing.

Another object of the present invention is to provide a MEMS device that is powered by optical power only.

Another object of the present invention is to provide an efficient drive circuit that draws almost no current except during the short period of an optical switching cycle.

Another object of the present invention is to provide a drive circuit that does not need continuous optical power, only needing optical power when a switching cycle is anticipated.

SUMMARY OF THE INVENTION

Accordingly, the present invention relates to a micro-electro-mechanical device comprising:

a power source for generating a relatively-low substantially-constant voltage;

an electrical circuit for converting the constant voltage into a relatively higher voltage pulse; and a MEMS device including an actuator for moving a body from a first position to a second position after receiving the voltage pulse.

BRIEF DESCRIPTION OF THE DRAWINGS

The invention will be described in greater detail with reference to the accompanying drawings which represent preferred embodiments thereof, wherein:

FIG. 3b is one example for a power source for the drive circuit of FIG. 3a; and

DETAILED DESCRIPTION

Figure 1:
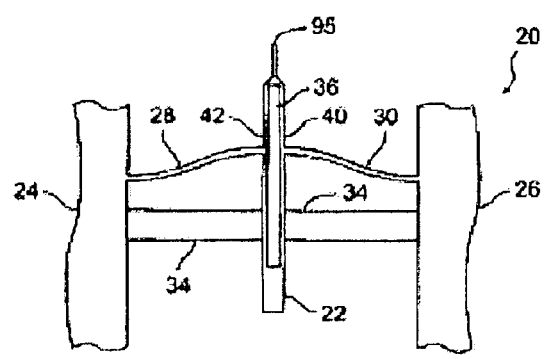
FIG. 1 is a schematic illustration of a conventional 2×2 MEMS switch.

An example of a conventional MEMS device is illustrated in FIG. 1, in which a bi-stable 2×2 switch 20 includes a reciprocating center body 22 pivotally mounted to fixed supports 24 and 26 via spring arms 28 and 30, respectively. An actuator 34, as will be hereinafter described with reference to FIG. 2, is used to move the center body 22 between two stable positions. The center body 22 includes a hollow portion 36 defined by side walls 40 and 42. The hollow portion 36 enables the side walls 40 and 42 to slightly deform during actuation of the center body 22, thereby providing an energy barrier, i.e. a latch, that must be overcome before returning to the other position. Typically the end 95 of the center body 22 includes a reflective surface on each side thereof for reflecting optical signals between waveguides, as is well known in the art.

Figure 2A:
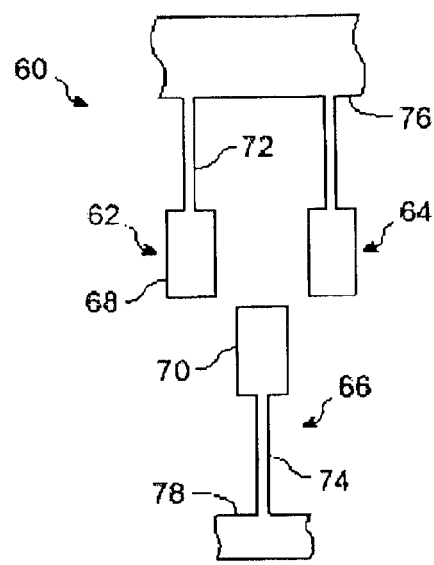
FIGS. 2a and 2b are schematic illustrations of a comb drive actuator for the switch of FIG. 1.

The actuator 34 can take several forms such as magnetic, electrical and electrostatic. FIG. 2a is a simplified top view of a portion of an electrostatic comb drive 60 according to a preferred embodiment of the present invention in a first switch position or state. The comb drive 60 includes fixed fingers 62, 64 and movable fingers 66, only one of which is shown for simplicity of illustration. Comb drives typically have dozens, if not hundreds, of inter-digitized fingers, and are often formed in thin films of silicon using photolithography and anisotropic etching techniques. In this embodiment, each finger has a wide section 68, 70 and a narrow section 72, 74 attaching the wide sections 68, 70 to the base 76 or movable element 78, respectively.

The wide sections 68, 70 increase the inter-finger capacitance when they are aligned, thus decreasing the electrostatic potential. In a particular embodiment the narrow sections are about 3 microns wide and the wide sections were at least 7 microns wide. The gap between the fingers when the wide sections are aligned is about 1–2 microns. In another embodiment, the narrow sections were about 3 microns wide and the wide sections were about 13 microns wide. It is generally desirable that the wide sections be at least three times wider than the narrow section to facilitate bi-directional operation of the electrostatic comb drive. When a voltage is applied between the fixed and moving electrodes, the moving part experiences an attractive force to pull it toward the fixed part so that the thick portions are aligned and the gap between the fingers is the least.

Although the wider sections are illustrated as rectangular blocks, other shapes may be fabricated to achieve desired electrostatic drive performance. For example, the wider sections 68 and 70 could be wider near the tip to facilitate more rapid initial acceleration of the movable portion, tapering to a narrower width near the narrow section 72 and 74 to reduce the total electrostatic force-time product. Similarly, it is not necessary that the wider sections 68 on the fixed fingers 62 and 64 be the same or even similar to the wider sections 70 on the movable fingers 66.

Figure 2B:
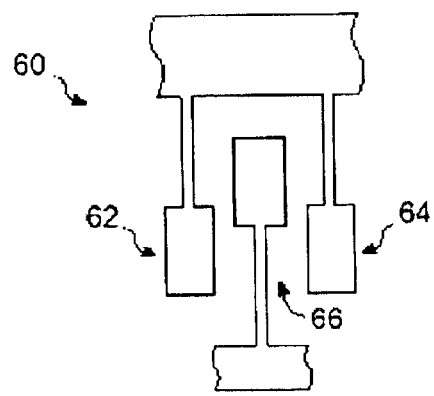

FIG. 2b is a simplified top view of the comb drive shown in FIG. 2a in a second position. The movable fingers 66 have been attracted to the fixed fingers 62, 64 by applying a voltage pulse between the two halves of the comb drive. The voltage pulse was maintained long enough to accelerate the movable element 78 of the drive to a sufficient energy to reach the second position. The voltage pulse can be maintained after the wide portions 68 and 70 of the two sets of fingers pass each other to slow the movable element 78 before it reaches the second position. An inflection point occurs between the two stable positions, at which point the forces are balanced, and after which the actuator 34 begins to apply a force in the opposite direction for braking the switch. Spring arms 28 and 30 or other motive elements can contribute to the movement of the movable element 78. A latching technique, such as the one described with reference to FIG. 1, holds the movable element 78 in the second position. Another feature is that once the movable element 78 reaches the target position, voltage of the same polarity can be used to switch the movable element 78 back to the initial position, also with deceleration. Thus the same or very similar electric pulse can be used to toggle the switch between states.

Figure 3A:
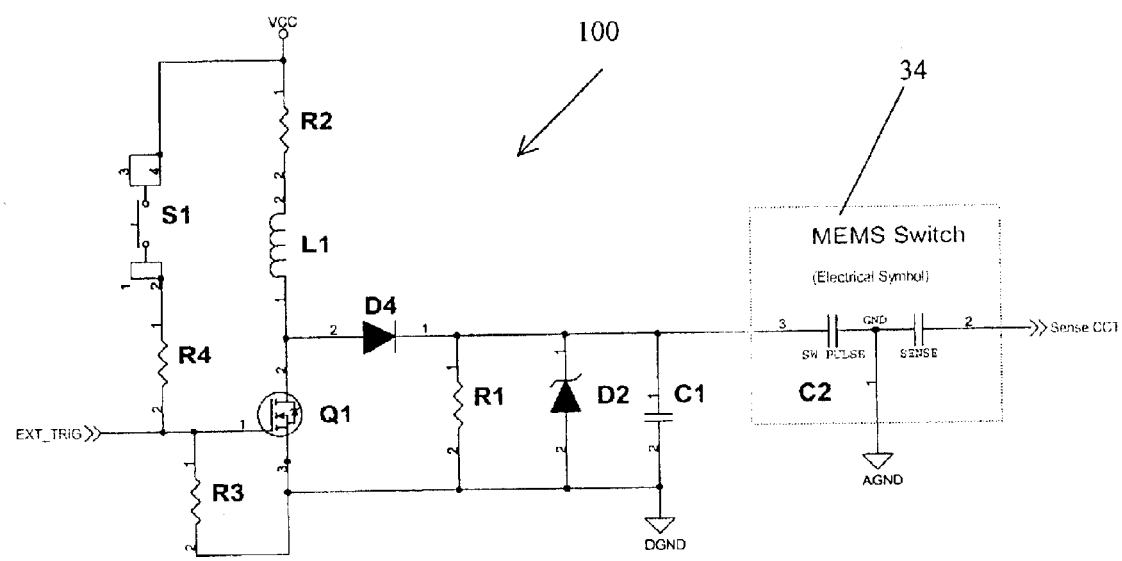
FIG. 3a is a circuit diagram of the drive circuit for a MEMS device according to the present invention.

A preferred voltage pulse for actuating and braking the MEMS device 20 is provided by the electric circuit 100 illustrated in FIG. 3. In general, an inductor L1 is used to send a high voltage spike to charge a drive capacitor C1, which discharges slowly creating an exponentially decaying voltage pulse used to drive the aforementioned actuator 34.

In detail, an on/off switch S1 closes the circuit 100 and activates the input voltage $V_{cc}$ across a first resistor $R_3$, turning on a transistor $Q_1$, which in turn applies $V_{cc}$ across an inductor $L_1$. The input voltage $V_{cc}$ is much less than is normally required to power a MEMS device, e.g. 2 to 10 volts, typically 3 volts. A second resistor $R_2$ establishes a current ($I_1$) and therefore the energy in the inductor $L_1$ according to the equation $E_{inductor}=½(V_{cc}/R_2)^2 L_1$. Typically the current ($I_t$) in inductor $L_1$ ranges between 100 μA and 10 mA, depending on the inductance of the inductor $L_1$. Inductors with smaller inductances require larger currents, i.e. smaller resistances $R_2$, to store the required energy and generate the required voltage spike to power the actuator 34, e.g. comb drive 60. The transistor $Q_1$ turns on and saturates when the switch $S_1$ is activated, thereby switching the transistor $Q_1$ into a conducting mode with about a 10Ω resistance between the source and the drain. When the switch $S_1$ is released the transistor $Q_1$ switches to the off state. The switching speed of the transistor $Q_1$ establishes the amplitude of the voltage spike according to the equation $V(t)=-L_1 \, dl_1(t)/dt$. Due to the negative sign in the inductor relationship, a positive voltage appears at the lower node of the inductor $L_1$ when the switch $S_1$ is turned off, i.e. this is a falling edge triggered device. This positive voltage at the lower node causes a diode $D_4$ to conduct, and the drive capacitor to charge up to the required voltage. The voltage spike only lasts for about 1 μs, but that is enough time to charge the capacitor to the required voltage, which for the preferred embodiment is between 60V and 90V. The diode $D_4$ prevents any charge from flowing backwards therethrough, thereby ensuring that the stored voltage drains from the drive capacitor $C_2$ and storage capacitor $C_1$ through a bleed resistor $R_1$ with effective resistance $R_B$. Zener diode $D_2$ may be used to set the maximum voltage of the high voltage pulse or to protect the MEMS device from excessive voltages.

If we assume ideal electrical components, all of the energy in the inductor $L_1$ will be transferred to the capacitor $C_1$. The energy in the capacitors is also given by the equation $E_{capacitor}=½V_s^2 C_T$, wherein $V_s$ is the peak amplitude of the voltage spike at the lower node of the inductor $L_1$, and $C_T$ is the total capacitance, equal to $C_1$ plus $C_2$ in this example circuit, since the two capacitors are in parallel. Since the voltage across the capacitors $C_1$ and $C_2$ decreases exponentially with time constant $t=R_B C_T$, the effective width of the pulse can be controlled by changing the resistance $R_B$ and/or changing the effective capacitance of the capacitor $C_T$, e.g. changing the specific capacitance of the capacitor $C_1$ or adding additional capacitors in series or parallel. As an example: if $R_B$ is 10 MΩ and $C_T$ is 50 pF, then $t=R_B C_T=10$ MΩ×50 pF=500 μs, i.e. the amplitude of the voltage has decreased by one half after 500 μs. In other words, a 3V source has been converted into a 60 V and 90 V spike lasting 1 μs, which has been converted into a pulse with a peak amplitude between 60 V and 90 V decaying exponentially with a time constant of 500 μs.

One method of ensuring that the amplitude of the voltage spike will be constant regardless of a variation in the supply voltage amplitude is to ensure that the inductor is saturated for all supply voltage amplitudes above the lowest expected value. Accordingly, the inductor $L_1$ will store the same maximum amount of energy for all supply voltage amplitudes, since increasing the current through a saturated inductor will not store additional energy.

Tests have shown that only minimum ringing results for a large range in voltage amplitudes as long as the correct time constant is used for the exponential decay. The higher peak amplitude imparts a higher velocity to the center body 22, i.e. the center body 22 reaches the force inflection point sooner, thereby still receiving enough braking force. Lower amplitude pulses impart a slower velocity to the center body 22 resulting in the center body 22 reaching the inflection point later, but with less energy that is still removed without ringing. Ideally, the system is designed so that the slope of the voltage decay corresponds to the speed of the actuator 34 to correctly balance the driving and braking forces.

Figure 3B:
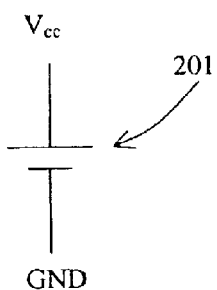
Figure 4:
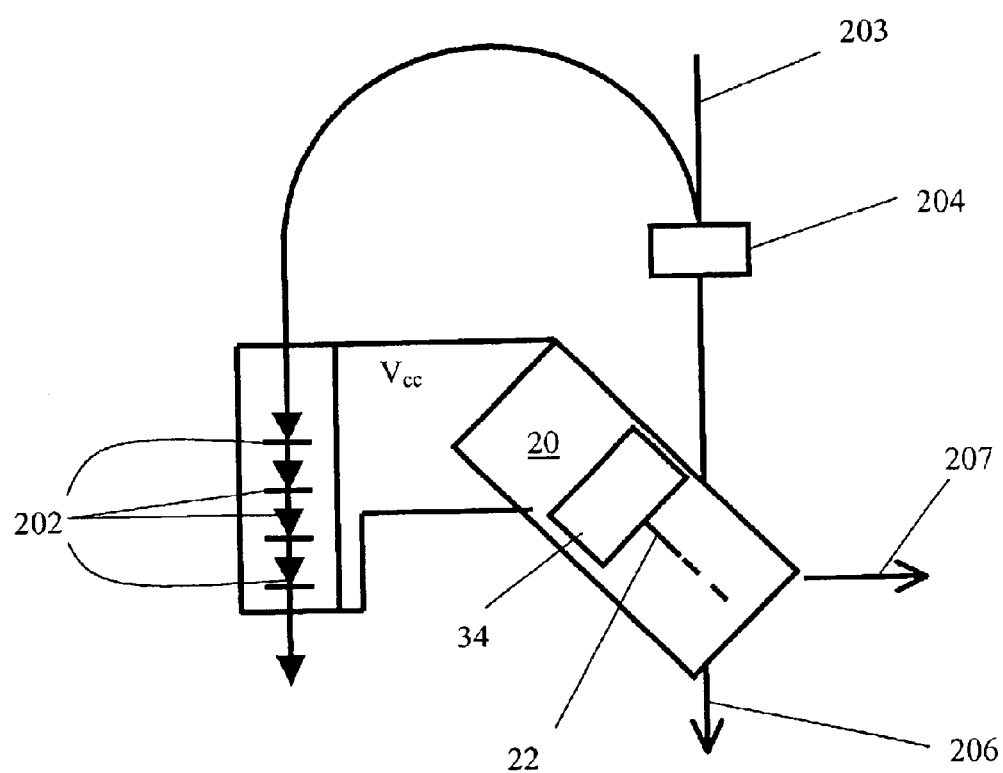
FIG. 4 is another example of a power source for the drive circuit of FIG. 3a utilizing optical power.

FIGS. 3b and 4 represent two examples of power sources that can be used to provide the voltage $V_{cc}$. The first and simplest example (FIG. 3b) is a 3V lithium battery 201. The second example (FIG. 4) includes a plurality of photodiodes 202 (or other device for converting light into energy) connected in series. With this arrangement light can be used to power the device. A separate switching signal can be sent to the switch if the corresponding information signal is to be switched or preferably the light beams that are to be switched can be used to power the switch. In a specific example, a wavelength division multiplexed (WDM) signal traveling along an optical fiber 203 may include a special wavelength channel, which determines whether the signal should be switched. When the signal approaches the switch 20, the signal channel is demultiplexed from the remainder of the signal by a WDM filter 204 to power the switch 20 and redirect the signal along an alternate path 207. The mere existence of the signal channel at a predetermined wavelength may activate the switch 20 or information stored in the signal channel may result in the signal continuing on along path 206 or being redirected along path 207. The number of photodiodes 202 required is obviously dependent upon the efficiency thereof. Typically to generate the required 3 Volts, five to twelve photodiodes generating from 0.25 V to 0.6 V each are required. Alternatively, the WDM filter 204 can be replaced by any form of beam splitting device that taps a portion of the original signal to power the switch 20.

We claim:

1. A micro-electro-mechanical (MEMS) device comprising:
   a power source for generating a relatively-low substantially-constant voltage;
   an electrical circuit for converting the constant voltage into a relatively-higher voltage pulse; and
   a MEMS component including an actuator for moving a body from a first position to a second position after receiving the voltage pulse.

2. The device according to claim 1, wherein the power sources comprises a plurality of photodiodes for converting light energy from an optical signal into the constant voltage.

3. The device according to claim 2, further comprising a beam splitter for separating a portion of the optical signal from a remainder of the optical signal; wherein the portion of the optical signal is directed at the plurality of photodiodes for generating the voltage, and the remainder of the optical signal is redirected by the MEMS component.

4. The device according to claim 2, wherein the beam splitter is a wavelength division demultiplexor for separating a wavelength channel from the optical signal.

5. The device according to claim 1, wherein the actuator comprises an electrostatic comb drive actuator including a fixed element and a moveable element, each of the fixed and the moveable elements including a plurality of fingers extending from a base, and each of the fingers having a wider section at the outer free end thereof and a narrow section extending between the wider section and the base.

6. The device according to claim 5, wherein the body is connected to the moveable element; and wherein the body includes a reflective surface for redirecting an optical signal from a first path to a second path when in the second position.

7. The device according to claim 6, wherein the MEMS component is a bi-stable switch including a latch for maintaining the body in the first or the second position.

8. The device according to claim 1, wherein the voltage pulse is an exponentially decaying voltage pulse, thereby limiting any ringing as the body arrives at either the first or second positions.

9. The device according to claim 8, wherein the voltage pulse is maintained after the body has reached the second position, thereby providing a braking force to the body.

10. A micro-electro-mechanical (MEMS) device comprising:
    a power source for generating a relatively-low substantially-constant voltage;
    an electrical circuit for converting the constant voltage into a relatively-higher voltage pulse; and
    a MEMS component including an actuator for moving a body from a first position to a second position after receiving the voltage pulse;
    wherein the MEMS component is a bi-stable switch including a latch for maintaining the body in the first or the second position;
    wherein the actuator comprises an electrostatic comb drive actuator including a fixed element and a moveable element, each of the fixed and the moveable elements including a plurality of fingers extending from a base, and each of the fingers having a wider section at the outer free end thereof and a narrow section extending between the wider section and the base;
    wherein the voltage pulse is maintained after the body has reached the second position, thereby providing a braking force to the body;
    wherein the voltage pulse is an exponentially decaying voltage pulse, thereby limiting any ringing as the device arrives at either the first or second positions;
    wherein the electrical circuit comprises:
       a first resistance for setting a current based on the constant voltage;
       a transistor for setting a rate of change of the current;
       an inductor for providing a voltage spike based on the rate of change of the current;
       a capacitor charged up by the voltage spike from the inductor for providing the exponentially decaying voltage pulse to the MEMS component according to a time constant; and
       a second resistance for setting the time constant.

11. The device according to claim 10, wherein the voltage spike lasts for approximately 1 $\mu$s.

12. The device according to claim 11, wherein an amplitude of the voltage spike is between 60 volts and 90 volts.

13. The device according to claim 12, wherein a maximum value of the voltage pulse is between 60 volts and 90 volts.

14. The device according to claim 13, wherein the power source generates constant voltages ranging between a low voltage and a high voltage; and wherein the inductor becomes saturated at the low voltage; whereby the amplitude of the voltage spike is constant for all constant voltages above the low voltage.

15. The device according to claim 10, wherein the time constant of the exponentially decaying voltage pulse is longer than a travel time between the first and second positions.

16. The device according to claim 15, wherein the time constant is approximately 500 $\mu$s.

17. The device according to claim 10, wherein the power source comprises a plurality of photodiodes for converting light energy from an optical signal into the constant voltage.

18. The device according to claim 17, further comprising a beam splitter for separating a first portion of the optical signal from a remainder of the optical signal; wherein the first portion of the optical signal is directed at the plurality of photodiodes for generating the constant voltage, and at least a second portion of the optical signal is redirected by the bistable switch.

19. The device according to claim 18, wherein the beam splitter comprises a wavelength division demultiplexor for separating a wavelength channel from the optical signal for directing at the plurality of photodiodes for generating the constant voltage.

20. The device according to claim 10, wherein the constant voltage is between 2 and 10 volts.

* * * * *